United States Patent [19]

Joncour

[11] Patent Number: 4,798,459

[45] Date of Patent: Jan. 17, 1989

[54] OPHTHALMIC LENS CENTERING DEVICE

[75] Inventor: Christian Joncour, Saint-Maurice, France

[73] Assignee: ESSILOR INTERNATIONAL Cie Generale d'Optique, Creteil, France

[21] Appl. No.: 123,318

[22] Filed: Nov. 20, 1987

[30] Foreign Application Priority Data

Nov. 26, 1986 [FR] France ................................ 86 16464

[51] Int. Cl.[4] ................................................ G01B 9/00

[52] U.S. Cl. ...................................... 356/127; 356/392

[58] Field of Search ................ 356/127, 391, 392, 393; 33/507; 51/101 LG, 105 LG, 106 LG, 284 E

[56] References Cited

U.S. PATENT DOCUMENTS 3,645,632 2/1972 Schmidt et al. ................ 356/127 X 3,858,982 1/1975 Meckler .............................. 356/127

FOREIGN PATENT DOCUMENTS 2188182 1/1974 France .

*Primary Examiner*—F. L. Evans

*Attorney, Agent, or Firm*—Charles E. Brown; Charles A. Brown

[57] ABSTRACT

An opthalmic lens centering device comprises a frame on which is a translucent first support plate which receives an opthalmic lens to be centered. There is a frosted screen at the base of the first support plate. A projector system above the first support plate projects an image of the ophtlalmic lens onto the frosted screen. A first observation channel and an opening in the frame enable an operator to view the frosted screen. A second support plate receives a template with which the opthalmic lens is to be compared. A second observation channel in conjunction with the same opening in the frame enables the operator to view the second support plate. The first and second observation channels have a common emergent section of which the opening in the frame forms part. There is a recess in the frame, opening onto its front surface, by means of which the second support plate is disposed at the front of the frame.

8 Claims, 1 Drawing Sheet

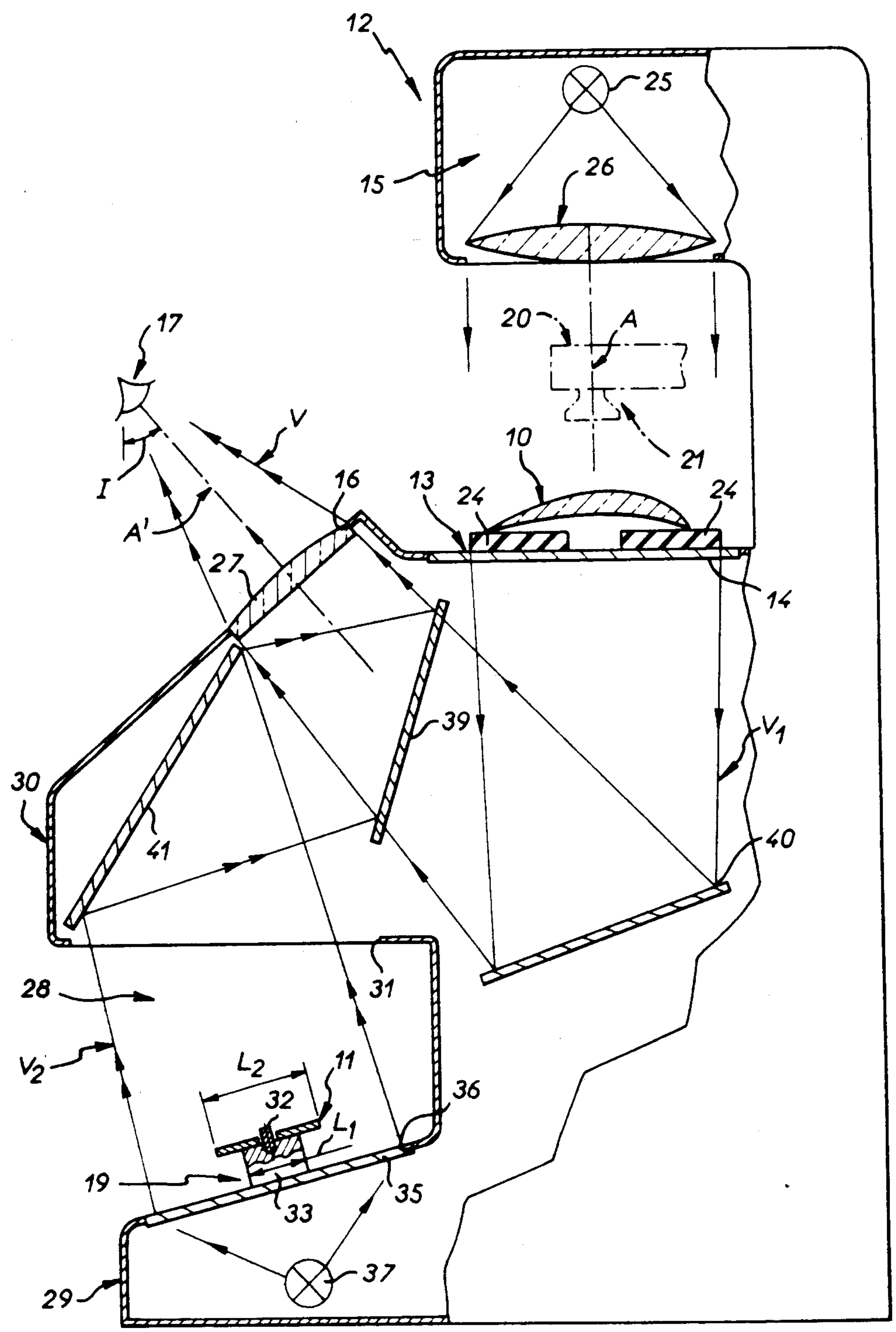
12
25
15
26
20
A
17
V
21
10
I
16
13
24
24
A'
27
14
39
V1
30
41
40
28
31
V2
L2
11
32
36
L1
19
33
35
37
29

OPHTHALMIC LENS CENTERING DEVICE

BACKGROUND OF THE INVENTION

1. Field of the Invention

The present invention is generally concerned with centering an ophthalmic lens relative to a reference axis and the operations usually accompanying such centering.

2. Description of the Prior Art

As is well known, in order to match an ophthalmic lens to the specific contour of the rim or surround of the eyeglass frame to which it is to be fitted, it is usually ground on a grinding machine and, in order to fit it to and support it on the grinding machine, it is usual to apply to it a handling and support block, such as a simple sucker, for example, adapted to adhere to it in a removable way.

When the ophthalmic lens is a prescription lens, it is important that its position relative to the rim or surround of the eyeglass frame to whic it is to be fitted, and therefore its preliminary grinding to suit the contour of the latter, shoudl take into account various ocular parameters, in particular the interpupillary distance of the person concerned.

It is therefore important that, before it is fitted to the grinding machine used to grind it, its optical center is very strictly located relative to a reference axis, which may simply be that of the handling and support block to be applied to it, for example.

However, it is also necessary to ensure that the rim or surround and the ophthalmic lens to be fitted to it are compatible, by comparison of the lens with a template representing the rim or surround of the eyeglass frame, since grinding of the lens should not lead to removal of any substantial part of its operative sight correcting part.

Centering devices which make provision for such comparison have already been proposed.

This is the case, for example, with that which is the subject matter of French patent application No. 72 19694 of June 1, 1972 published under the number 2 188 182.

To the stated end this centering device comprises, on a frame, a translucent first support plate adapted to receive an ophthalmic lens to be centerd, a frosted screen at the base of said first support plate, a projector system above said first support plate adapted to project an image of said ophthalmic lens onto said frosted screen, a first observation channel and an opening in said frame enabling an operator to view said frosted screen, a second support plate adapted to receive a template with which said ophthalmic lens is to be compared, and a second observation channel adapted in conjuction with said opening in said frame to enable said operator to view said second support plate, said first and second observation channels sharing a common emergent section of which said opening forms part.

Thus the operator can view at the same time the superposed images of the ophthalmic lens to be ground and of the template corresponding to the rim or surround of the eyeglass frame to which it is to be fitted. After centering the ophthalmic lens relative to the corresponding reference axis, the operator can then check that the compatibiity between it and the rim or surround of the eyeglass frame is actually satisfactory.

However, in the centering device in question the support plate adapted to receive a template is in practise at the rear of the frame of the device and consists in a drawer sliding laterally relative to the frame.

This has various disadvantages.

First of all, and by virtue of its position at the back of the frame, the accessibility of the support plate implemented in this way as a drawer is relatively mediocre, which makes the operations needed to fit a template to it somewhat difficult.

Also, there is more than one operation involved, namely extracting the drawer from the frame, fitting the template to the drawer and reinserting the combination into the farme, which inevitably wastes a significant amount of operator time.

Finally, and most importantly, the returning of the drawer consitutes the template support plate to its initial position is not adequately controlled, so that there remains some uncertainty as to the position of the drawer and thus of the template in the device when the ophthalmic lens to be ground is compared with the template.

A general object of the present invention is an arrangement providing a very simple way of circumventing these disadvantages.

SUMMARY OF THE INVENTION

The present invention consists in an ophthalmic lens centering device comprising a frame and on said frame a transucent support plate adapted to receive an ophthalmic lens to be centerd, a frosted screen at the base of said first support plate, a projector system above said first support plate adapted to project an image of said ophthalmic lens onto said frosted screen, a first observation channel and an opening in said frame enabling an operator to view said frosted screen, a second support plate adapted to receive a template with which said ophthalmic lens is to be compared, a second observation channel adapted in conjunction with said opening in said frame to enable said operator to view said second support plate, said first and second observation channels sharing a common emergent section of which said opening in said frame forms part, and a recess in said frame opening onto a front surface thereof by means of which said second support plate is disposed at the front of said frame.

Thus access to the second support plate is advantageously immediate.

Furthermore, as the second support plate is fixed relative to the frame, it does not have to be manipulated in any way to fit a template into the frame, and such fitting is unequivocally accurate, said support plate being by construction correctly located in the frame.

Also, as the frame of the device in accordance with the invention does not need any space at the back for installing the template support plate, it is dvantageously possible in an ergonomic way to use an observation axis, that is to say the axis of the opening in the frame through which the template and an image of the ophthalmic lens to be ground are simultaneously observed, closer to the vertical.

Thus in accordance with another feature of the invention the inclination of the axis of the opening in the frame to the vertical is advantageously between 25° and 40°, this angle being approximately 30°, for example.

Finally, according to a further feature of the invention, the support plate adapted to receive the template comprises a base adapted to receive a template which has at least one plane dimensions less than the dimensions in the same direction of the template or templates it is adapted to receive.

This has the advantage of facilitating the placing of a template onto the support plate and its removal thereform by hand.

The characteristics and advantages of the invention will emerge from the following description given by way of example only and with reference to the appended diagrammatic drawing in which the single FIGURE is a view in elevation and cross-section of a centering device in accordance with the invention.

DESCRIPTION OF THE PREFERRED EMBODIMENT

As schematically represented in the figure, the aim is, after centering an ophthalmic lens 10 relative to a reference axis A, to compare its contour with that of a template 11 which represents the rim or surround of an eyeglass frame to which the ophthalmic lens 10 is to be fitted.

The centering device in accordance with the invention used for this purpose comprises, in a way that is known per se, a frame 12 and, on the latter, a translucent first support plate 13 which is adapted to receive the ophthalmic lens 10 to be centerd. At its base it comprises or itself consists of a frosted screen 14, a projector system 15 disposed above said first support plate 13 and adapted to form on said frosted screen 14 an image of the ophthalmic lens 10, a first observation channel V1 schematically represented by single-headed arrows in the figure which, by means of an opening 16 in the frame 12, is adapted to enable an operator 17, schematically represented by an eye in the figure, to view the frosted screen 14, a second support plate 19 adapted to receive the template 11 with which the ophthalmic lens 10 is to be compared, and a second observation channel V2, schematically represented by double-headed arrows in the figure, which by means of the same opening 16 in the frame 12 is adapted to enable the operator 17 to view said second support plate 19. Said first and second observation channels V1, V2 share a common emergent section V which, as far as the operator 17 is concerned, forms the observation channel proper, and of which the opening 16 in the frame 10 forms part.

As schematically represented in chain-dotted line in the figure the device is completed by an arm 20 which is mounted to move between a retracted idle position (not shown) and a deployed operative position in which, as shown, it is disposed between the support plate 13 and the projector system 15; the arm 20 is adapted to place a handling and support block 21, such as simple sucker, for example, on the ophthalmic lens 10.

The reference axis A, which is the axis of the projector system 15 and with which the handling and support block 21 is aligned when it is placed on the ophthalmic lens 10, is in practise marked by a cross on the frosted screen 14 forming the support plate 13.

In a manner that is known per se there is further associated with the support plate 13 a set of cross-hairs (not visible in the figure) actuated by control means accessible to the user and movable transversely relative to the reference axis A; the cross-hairs carry a number of graduations catering for the ocular parameters to be taken into consideration, in particular the interpupillary distance of the person concerned.

The ophthalmic lens 10 is supported on the support plate 13 through the intermediary of elastic buffers 22, of which there may be three in a Y-shaped arrangement, for example, designed to absorb the force applied to the ophthalmic lens 10 when the handling and support block 21 is placed on it.

In a way that is known per se the projector system 15 comprises a light source 25 and a condenser lens 26 adapted to form a parallel beam.

Finally, and also in a way that is known per se, a magnifying lens 27 is placed in the openign 16 in the frame 12 through which observations are made.

As these various arrangements do not form part of the present invention they will not be described in more detail here.

Likewise, as the frame 12 does not of itself form part of the present invention it will not be described in complete detail here.

Only those of its component parts necessary to an understanding of the invention will be described.

In accordance with the invention, the support plate 19 adapted to receive a template 11 is disposed at the front of the frame 12 by means of a recess 28 in the latter which opens onto its front surface, in other words towards the operator 17.

As seen from the front of the frame 12, the support plate 19 is disposed in front of the axis of the projector system 15, in other words in front of the reference axis A.

It is slightly inclined and disposed on the upper part of a baseplate section 29 of the frame 12 and an intermediate part 30 of the frame 12 projecting cantilever-fashion or console-fashion from its main part overlies it, having in its upper part, substantially level with the support plate 14, the opening 16 corresponding to the section V common to the two observation channels V1, V2 and in its lower part an opening 31 which, as will emerge hereinafter, forms part of the observation channel V2.

The support plate 19 comprises at least one projecting peg 32 over which the template 11 has to be fitted. Two spaced parallel pegs 32 are in practise provided in order to hold the template 11 in position.

Only one of these pegs 32 is visible in the figure.

The support plate 19 comprises a base 33 for receiving the template 11 which carries the projecting pegs 32 and has one plane dimension in at least one direction which is less than that in the same direction of the template 11.

As shown here, for example, the width L1 of the base 33 is less than the corresponding width L2 of the template 11.

The base 33 of the support plate 19 is carried by a translucent baseplate 35 disposed in an opening 36 in the frame 12 under which the frame 12 contains a light source 37 to illuminate the template 11.

In addition to the opening 16 in the frame 12, the two observation channels V1, V2 share a common semi-reflecting mirror 39 which is transparent relative to the observation channel V1, that corresponding to observation of the ophthalmic lens 10 to be centerd, whereas the observation channel V2, that corresponding to observation of the template 11, is reflected from said semi-reflecting mirror 39 towards said opening 16 in the frame 12.

Between the support plate 13 and the semi-reflecting mirror 39 the observation channel V1 comprises a mirror 40; likewise, between the support plate 19 and the semi-reflecting mirror 39 the observation channel V2 comprises a mirror 41; said mirrors 40 and 41 are disposed one on each respective side of said semi-reflecting mirror 39 and appropriately oriented relative to it.

The axis A' of the openign 16 in the frame 12 which forms the axis of the section V common to the two observation channel V1, V2 is inclined to the vertical by an angle I between 25° and 40°, preferably in the vicinity of 30°.

This inclination has the advantage of being ergonomically suited to the operator 17.

It is to be understood that the reference axis A is vertical and that the support plate 13 adapted to receive the ophthalmic lens 10 to be centerd is horizontal.

The inclination of the semi-reflecting mirror 39 and those of the mirrors 40 and 41 are determined accordingly.

The semi-reflecting mirror 39 and the mirrors 40 and 41 are appropriately attached to the frame 12, of course.

Prior to intervention of the arm 20 carrying the handling and support block 21 to be placed on the lens, the cross-hairs supported with the frosted screen 14 constituting the support plate 13 adapted to receive the ophthalmic lens 10 are appropriately positioned relative to the cross which marks the reference axis A on said frosted screen 14, allowing for the various ocular parameters to be takn into account.

The ophthalmic lens 10 is in turn placed on the support plate 13, appropriately positioned relative to the graduations on the cross-hairs by means of its own markings.

Where necessary it is also appropriately oriented by rotating it about its axis.

The ophthalmic lens 10 having thus been centerd relative to the reference axis A, its contour is compared with that of the template 11.

It will have been noted that it is easy to fit the template 11, from the front of the frame 12, and that since the support plate 19 is fixed relative to the frame the positioning relative to the latter is advantageously accurate, requiring no manipulation or movement of the support plate 19.

It them remains merely to actuate the arm 20 to place on the lens the handling and support block 21 to it.

It is to be understood that the present invention is not limited to the embodiment shown and described, but encompasses any variant execution thereof.

There is claimed:

1. Ophthalmic lens centering device comprising a frame and on said frame a translucent support plate adapted to receive an ophthalmic lens to be centered, a frosted screen at the base of said first support plate, a projector system above said first support plate adapted to project an image of said ophthalmic lens onto said frosted screen, a first observation channel and an opening in said frame enabling an operator to view said frosted screen, a second support plate adapted to receive a template with which said ophthalmic lens is to be compared, a second observation channel adapted in conjunction with said opening in said frame to enable said operator to view said second support plate, said first and second observation channels sharing a common emergent section of which said opening in said frame forms part, and a recess in said frame opening onto a front surface thereof by means of which said second support plate is disposed at the front of said frame.

2. Device according to claim 1, wherein said second support plate is disposed to the front of the axis of said projector system.

3. Device according to claim 1, wherein said second support plate carries at least one projecting peg over which a template can be fitted.

4. Device according to claim 1, further comprising a semi-reflecting mirror shared by said first and second observation channels which is transparent relative to said first observation channel and reflective relative to said second observation channel.

5. Device according to claim 4, wherein said second observation channel comprises a mirror between said second support plate and said semi-reflecting mirror.

6. Device according to claim 1, wherein said opening in said frame has an axis inclined to the vertical by an angle between 25° and 40°.

7. Device according to claim 6, wherein said opening in said frame has an axis inclined to the vertical by an angle of substantially 30°.

8. Device according to claim 1, wherein said second support plate comprises a base adapted to receive a template which has at least one plane dimensions less than the dimension in the same direction of the template or templates it is adapted to receive.

* * * * *